(12) United States Patent
Masiyowski et al.

(10) Patent No.: US 8,863,270 B2
(45) Date of Patent: Oct. 14, 2014

(54) USER INTERFACE FOR PROVIDING VOICE COMMUNICATIONS OVER A MULTI-LEVEL SECURE NETWORK

(75) Inventors: John F. Masiyowski, Oak Hill, VA (US);
Raymond A. Magon, Fairfax, VA (US);
Michael O. Tierney, Ashburn, VA (US);
Robert L. Marchant, Severn, MD (US)

(73) Assignee: Raytheon Company, Waltham, MA (US)

( * ) Notice: Subject to any disclaimer, the term of this patent is extended or adjusted under 35 U.S.C. 154(b) by 855 days.

(21) Appl. No.: 12/686,946

(22) Filed: Jan. 13, 2010

(65) Prior Publication Data
US 2010/0299724 A1 Nov. 25, 2010

Related U.S. Application Data

(60) Provisional application No. 61/216,979, filed on May 22, 2009.

(51) Int. Cl.
*G06F 9/00* (2006.01)
*H04L 29/06* (2006.01)
(52) U.S. Cl.
CPC .......... *H04L 63/105* (2013.01); *H04L 65/1076* (2013.01); *H04L 63/30* (2013.01); *H04L 65/103* (2013.01)
USPC ...... 726/15; 726/4; 726/14; 726/30; 713/151; 713/153; 713/166
(58) Field of Classification Search
USPC ............ 726/4, 14, 15, 30; 713/153, 166, 151, 713/156
See application file for complete search history.

(56) References Cited

U.S. PATENT DOCUMENTS

| | | | |
|---|---|---|---|
| 4,981,371 A | 1/1991 | Gurak et al. |
| 5,577,209 A | 11/1996 | Boyle et al. |
| 5,974,142 A | 10/1999 | Heer et al. |
| 6,122,359 A | 9/2000 | Otto et al. |
| 6,243,376 B1 | 6/2001 | Ng et al. |
| 6,392,999 B1 | 5/2002 | Liu et al. |

(Continued)

FOREIGN PATENT DOCUMENTS

| | | |
|---|---|---|
| GB | 2 264 210 | 8/1993 |
| GB | 2264210 | 8/1993 |

(Continued)

OTHER PUBLICATIONS

CISCO Unified Comunications Manager: Security Guide, Release 7.0(1), CISCO Systems Inc., 2008, pp. 1-0 to 18-6.*
Masiyowski et al., U.S. Appl. No. 12/686,886, filed Jan. 13, 2010, entitled "Analog Voice Bridge".

(Continued)

*Primary Examiner* — Eleni Shiferaw
*Assistant Examiner* — Paul Callahan
(74) *Attorney, Agent, or Firm* — Daly, Crowley, Mofford and Durkee, LLP

(57) ABSTRACT

According to one embodiment, a computer system executing a computer program is coupled to multiple secure network domains configured in a multi-level security architecture. The computer program simultaneously establishes a voice connection with a first terminal configured on a first secure network domain and a second terminal configured on a second secure network domain. The computer program may then selectively couple an electroacoustical transducer to the first terminal or the second terminal, and generate an indicator on a user interface indicating the security level of the selected terminal.

27 Claims, 5 Drawing Sheets

(56) References Cited

U.S. PATENT DOCUMENTS

| | | |
|---|---|---|
| 6,411,965 B2 | 6/2002 | Klug |
| 6,445,931 B1 | 9/2002 | Lee |
| 6,728,784 B1 | 4/2004 | Mattaway |
| 6,760,421 B2 | 7/2004 | Heilmann et al. |
| 6,771,740 B1 | 8/2004 | Bingel |
| 6,775,273 B1 | 8/2004 | Kung et al. |
| 6,813,264 B2 | 11/2004 | Vassilovski |
| 6,829,234 B1 | 12/2004 | Kaplan et al. |
| 6,857,072 B1 | 2/2005 | Schuster et al. |
| 6,930,730 B2 | 8/2005 | Maxon et al. |
| 6,967,958 B2 | 11/2005 | Ono et al. |
| 7,099,653 B2 | 8/2006 | Creamer et al. |
| 7,127,048 B2 | 10/2006 | Bremer et al. |
| 7,133,514 B1 | 11/2006 | Cook et al. |
| 7,139,263 B2 | 11/2006 | Miller et al. |
| 7,149,208 B2 | 12/2006 | Mattaway et al. |
| 7,221,660 B1 | 5/2007 | Simonson et al. |
| 7,343,177 B2 | 3/2008 | Seshadri et al. |
| 7,415,005 B1 | 8/2008 | Macha et al. |
| 7,508,310 B1 * | 3/2009 | Light et al. ............... 340/573.1 |
| 7,512,967 B2 | 3/2009 | Sentoff |
| 7,567,555 B1 | 7/2009 | Ricciardi et al. |
| 7,571,317 B1 | 8/2009 | Vilhuber |
| 7,626,951 B2 | 12/2009 | Croy et al. |
| 7,634,533 B2 | 12/2009 | Rudolph et al. |
| 7,660,575 B2 | 2/2010 | Yeap et al. |
| 7,693,131 B2 | 4/2010 | Kaplan et al. |
| 7,701,974 B2 | 4/2010 | Mayer et al. |
| 7,711,828 B2 | 5/2010 | Shew et al. |
| 7,782,826 B2 | 8/2010 | Olivier et al. |
| 7,983,199 B1 * | 7/2011 | Nguyen et al. ............... 370/260 |
| 2002/0097708 A1 | 7/2002 | Deng |
| 2002/0129236 A1 | 9/2002 | Nuutinen |
| 2003/0018918 A1 | 1/2003 | Natsuno et al. |
| 2003/0051130 A1 | 3/2003 | MeLampy et al. |
| 2003/0128696 A1 | 7/2003 | Wengrovitz et al. |
| 2003/0167394 A1 | 9/2003 | Suzuki et al. |
| 2003/0224807 A1 | 12/2003 | Sinha et al. |
| 2004/0008423 A1 | 1/2004 | Driscoll, Jr. et al. |
| 2004/0034723 A1 | 2/2004 | Giroti |
| 2004/0203799 A1 | 10/2004 | Siegel |
| 2005/0257052 A1 * | 11/2005 | Asai et al. ............... 713/166 |
| 2005/0268336 A1 * | 12/2005 | Finnegan ............... 726/15 |
| 2006/0020800 A1 | 1/2006 | Holden et al. |
| 2006/0029050 A1 | 2/2006 | Harris et al. |
| 2006/0230143 A1 | 10/2006 | Ziegler et al. |
| 2007/0250921 A1 | 10/2007 | LiVecchi |
| 2007/0297588 A1 | 12/2007 | Benco et al. |
| 2008/0008312 A1 | 1/2008 | Ganesamoorthi et al. |
| 2008/0275813 A1 * | 11/2008 | Altberg et al. ............... 705/39 |
| 2009/0260066 A1 * | 10/2009 | Miller et al. ............... 726/6 |
| 2009/0271858 A1 | 10/2009 | Cooke et al. |
| 2010/0245107 A1 * | 9/2010 | Fulker et al. ............... 340/691.6 |
| 2010/0260173 A1 | 10/2010 | Johnson |

FOREIGN PATENT DOCUMENTS

| | | |
|---|---|---|
| WO | WO 01/37585 | 5/2001 |
| WO | WO 01/37585 | 5/2005 |
| WO | WO 2010/135124 | 11/2010 |
| WO | WO 2010/135162 | 11/2010 |
| WO | WO 2010/135163 | 11/2010 |

OTHER PUBLICATIONS

Masiyowski et al., U.S. Appl. No. 12/686,814, filed Jan. 13, 2010, entitled "System and Method for Providing Voice Communications over a Multi-Level Secure Network".

PCT Notification of Transmittal of the Intl. Search Report and the Written Opinion of the Intl. Searching Authority, or the Declaration mailed Oct. 1, 2010, re PCT/US2010/034823 filed May 14, 2010.

PCT Notification of Transmittal of the Intl. Search Report and the Written Opinion of the Intl. Searching Authority, or the Declaration mailed Oct. 1, 2010, re PCT/US2010/034629 filed May 13, 2010.

PCT Notification of Transmittal of the Intl. Search Report and the Written Opinion of the Intl. Searching Authority, or the Declaration mailed Oct. 5, 2010, re PCT/US2010/034824 filed May 14, 2010.

Examination Report dated Dec. 8, 2011; for GB Pat. App. No. 1119955.1, Nov. 18, 2011; 6 pages.

Response to Examination Report dated Dec. 8, 2011; for GB Pat. App. No. 1119955.1, filed Nov. 8, 2011; 7 pages.

Examination Report under Section 18(3) of Great Britain; dated Jul. 9, 2012; for GB Pat. App. No. 111-9955.1; 2 pages.

PCT/US2010/034823 International Report on Patentability dated Oct. 1, 2010, 8 pages.

PCT/US2010/034824 Int'l Preliminary Report on Patentability dated Nov. 22, 2011, 8 pages.

Office Action dated Jul. 9, 2012 for GB Appl. No. 1119955.1, 2 pages.

Response to Office Action dated Jul. 9, 2012, filed Sep. 10, 2012 for GB Appl. No. 1119955.1, 3 pages.

PCT Notification of Transmittal of the Intl. Search Report and the Written Opinion on the Intl. Searching Authority, or the Declaration mailed Oct. 5, 2010, re PCT/US2010/034824 filed May 14, 2010, 14 pages.

U.S. Appl. No. 12/686,814, filed Jan. 13, 2010, file through Oct. 19, 2012, 611 pages, Part1.

U.S. Appl. No. 12/686,814, filed Jan. 13, 2010, file through Oct. 19, 2012, 579 pages, Part2.

U.S. Appl. No. 12/686,814, filed Jan. 13, 2010, file through Nov. 2, 2012, 64 pages.

Letter dated Dec. 4, 2012 enclosing Official Notification of Grant of UK patent application No. GB1119955.1, issued Dec. 26, 2012, 3 pages.

Office Action dated Nov. 20, 2012 for U.S. Appl. No. 12/086,814, filed Jan. 13, 2012, 18 pages.

Response to Office Action dated Nov. 20, 2012 for U.S. Appl. No. 12/086,814, filed Feb. 19, 2013, 9 pages.

Terminal Disclaimer filed Feb. 19, 2013, for U.S. Appl. No. 12/086,814, 1 page.

Notice of Allowance in U.S. Appl. No. 12/666,814, filed Jan. 13, 2010, date mailed May 31, 2013, 12 pages.

Office Action dated Aug. 30, 2013 in U.S. Appl. No. 12/688,836, filed Jan. 13, 2010, 26 pages.

Final Office Action in U.S. Appl. No. 12/686,886 dated Aug. 30, 2013, 26 pages.

Response to Office Action in U.S. Appl. No. 12/686,886, filed Nov. 25, 2013, 13 pages.

Certification and Request for Consideration of an Information Disclosure Statement Filed After Payment of the Issue Fee under the QPIDS Pilot Program, RCE, Petition to Withdraw From Issue and an IDS filed in U.S. Appl. No. 12/686,814 on Sep. 17, 2013, 9 pages.

* cited by examiner

USER INTERFACE FOR PROVIDING VOICE COMMUNICATIONS OVER A MULTI-LEVEL SECURE NETWORK

RELATED APPLICATIONS

This application claims priority to U.S. Provisional Patent Application Ser. No. 61/216,979, entitled "METHOD AND SYSTEM FOR CREW COMMUNICATIONS USING MULTI-LEVEL REAL-TIME VOICE OVER IP INTERCOM," which was filed on May 22, 2009. U.S. Provisional Patent Application Ser. No. 61/216,979 is hereby incorporated by reference.

GOVERNMENT RIGHTS

This invention was made with government support under government contract number F09604-03-D-0007, Crew Communications. The Government has certain rights in this invention.

TECHNICAL FIELD OF THE DISCLOSURE

This disclosure generally relates to communication networks, and more particularly, to a user interface for providing voice communications over a multi-level secure network.

BACKGROUND OF THE DISCLOSURE

Information provided by network computing systems may incorporate various levels of security for protection of information they process from illicit use or access. Multi-level security (MLS) is one type of secure architecture in which differing processes process information at differing security and releasibility levels according to a one or more authorization levels associated with each user. Multiple independent levels of security (MILS) is another type of secure computing architecture in which processes process information in separately and distinctly from one another according to their assigned security level.

SUMMARY OF THE DISCLOSURE

According to one embodiment, a computer system executing a computer program is coupled to multiple secure network domains configured in a multi-level security architecture. The computer program simultaneously establishes a voice connection with a first terminal configured on a first secure network domain and a second terminal configured on a second secure network domain. The computer program may then selectively couple an electroacoustical transducer to the first terminal or the second terminal, and generate an indicator on a user interface indicating the security level of the selected terminal.

Some embodiments of the disclosure may provide numerous technical advantages. For example, one embodiment of the communication network may provide simultaneous communication of terminals with others that may have differing levels of security. Simultaneous communication is provided by an analog voice bridge that transfers analog voice communications while restricting the movement data packets from one secure network domain to the other. Thus, a user may communicate one or more voice messages with another terminal configured on his or her secure network domain simultaneously while communicating one or more other messages with another terminal configured on another secure network domain.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

Secure enterprise management of information processed on network computing systems may be accomplished by a multi-level security (MLS) architecture or a multiple independent levels of security (MILS) architecture. The multi-level security architecture usually incorporates a multi-tiered security scheme in which users have access to information managed by the enterprise based upon one or more authorization levels associated with each user. For example, enterprises, such as the government, utilize a multi-level security scheme that includes various security levels, such as unclassified, classified, secret, and top secret security levels, and may include one or more releasibility levels, such as a sensitive compartmented information (SCI), releasable (REL), and/or no foreign (NF) releasibility levels.

The United States Department of Defense (DoD) has issued a Director of Central Intelligence Directive 6/3 (DCID 6/3) entitled "Protecting Sensitive Compartmented Information Within Information Systems" for multi-level security architectures. The Director of Central Intelligence Directive 6/3 generally includes a set of guidelines for multi-level security networks that include several ascending levels of protection extending from a protection level 0 (PL0) to a protection level 5 (PL5). Specifically, the protection level 4 (PL4) protection level specifies that "The security support structure shall maintain separate execution domains (e.g., address spaces) for each executing process."

Various protocols, such as a voice over Internet protocol (VoIP) have been established to provide voice communications over data networks. The voice over Internet protocol provides for conversion of analog voice signals to a digital data stream suitable for transmission over a network, and signaling techniques for establishing differing types of voice connections, such as direct calls, conference calls, and intercom sessions between two or more users. Implementation of voice communications on secure data networks using protocols such as voice over Internet protocol have been accomplished with varying degrees of success. One detrimental aspect of implementing voice communications on secure data networks is that spoken communication may not be inherently labeled in the same manner in which data is typically labeled. Thus, implementation of voice communications on secure data networks has been relegated to multiple independent levels of security architectures in which it is often limited to use with in the confines of its particular security level domain.

Figure 1:
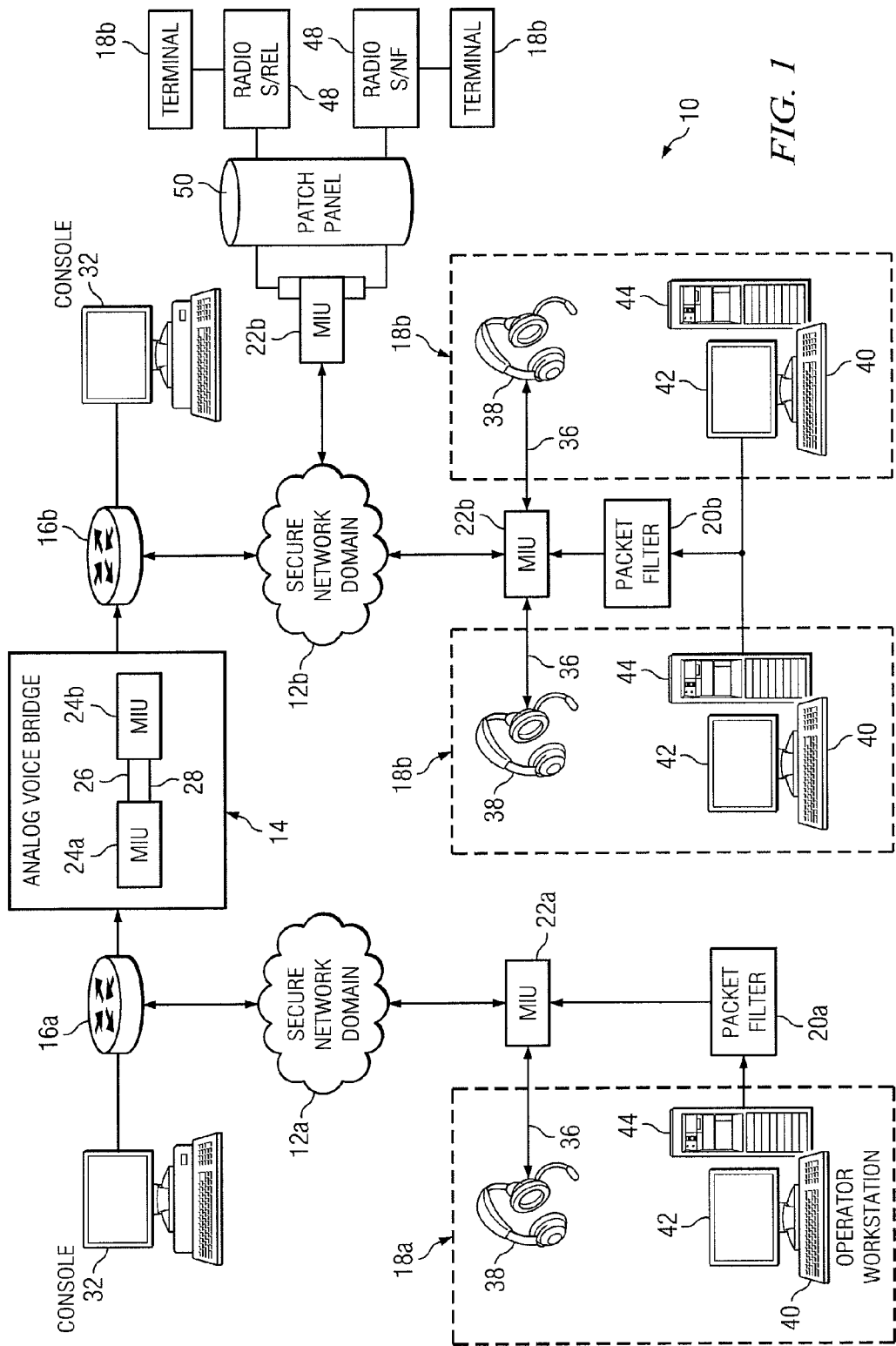
FIG. 1 is a diagram showing one embodiment of a multi-level security network that may implement a user interface according to the teachings of the present disclosure.

FIG. 1 is a diagram showing one embodiment of a multi-level security network 10 that may implement a user interface according to the teachings of the present disclosure. Multi-level security network 10 includes at least two secure network domains 12a and 12b that may or may not be classified at different security levels, that may include a multi-level security scheme incorporating classification/releasibility levels. Secure network domain 12a is coupled to an analog voice bridge 14 through a network switch 16a and to one or more terminals 18a through a packet filter 20a and a voice interface gateway 22a, respectively. Respectively, secure network domain 12b is coupled to analog voice bridge 14 through a network switch 16b and to one or more terminals 18b through a packet filter 20b and a voice interface gateway 22b. Analog voice bridge 14 includes two codec 24a and 24b for converting a data packet stream from its respective secure network domain 12a and 12b to or from an analog voice stream suitable for transmission across an analog voice line 26. Each network switch 16a and 16b is coupled to a console 32 for local configuration of its associated network switch 16a or 16b.

Terminals 18 may include a headset 38 and a computer system 40. Computer system 40 has a user interface 42 for displaying information to a user and receiving input from the user. User interface 42 displays information about voice connections established in communication network 10. User interface 42 may include an user output device such as a cathode ray tube (CRT), liquid crystal display (LCD), or a plasma display panel (PDP) that provides visual information. User interface 42 may also include a keyboard, mouse, console button, or other similar type user input device for providing user input to the communication network 10. Computer system 40 may also execute a voice terminal program 44 for establishing and maintaining voice call sessions on multi-level security network 10. In one embodiment, voice terminal program 44 is stored in the memory of computer system 40. In other embodiments, voice terminal program 44 may be stored on another node of its respective secure network domain 12 in which the various functions provided by voice terminal program 44 are served to computer system 40 using a client/server model.

Computer system 40 executing voice terminal program 44 may be any suitable type, such as a network coupled computing system or a stand-alone computing system. An example stand-alone computer system 40 may be a personal computer, laptop computer, or mainframe computer capable of executing instructions of voice terminal program 44. An example of a network computing system may include multiple computers coupled together via a network, such as a local area network (LAN), a metropolitan area network (MAN), or a wide area network (WAN).

In one embodiment, voice terminal program 44 comprises a JAVA applet that is stored in computer system 40 and executed in a web browser of computer system 40 in which voice communication through voice interface gateway 22 may be restricted to those terminals 18 using port 80 of the transfer control protocol (TCP) stack. Thus in some embodiments, the security of voice interface gateway 22 may be enhanced by restricting access to only those terminals 18 for which secure communication may be provided using commonly used components with well established security mechanisms, such as a hypertext transfer language secure (HTTPS) protocol. Voice interface gateways 22a and 22b may be coupled to terminals 18 in any suitable manner. In one embodiment, voice interface gateway 22a or 22b may send and receive analog voice signals through an analog voice line 36 coupled to headset 38 of terminal 18, and may send and receive data packet information through packet filter 20a and 20b to computer system 40 of terminal 18. The data packet information may be used for controlling voice connections of terminal 18 established through multi-level security network 10.

Headset 38 may include any suitable type of electroacoustical transducer that converts analog voice signals to sound and vice-versa. For example, headset 38 may include a microphone for generating analog voice signals from sound and a speaker for generating sound from analog voice signals transmitted from remotely configure terminals 18.

In another embodiment, voice interface gateway 22 may be coupled to one or more wireless networks 48, such as a secret/releasable (S/REL) network or a secret/no foreign (S/NF) network. In some embodiments, a patch panel 50 may be provided to couple analog voice lines and data packet lines between voice interface gateway 22 and wireless networks 48 in an organized manner.

The multi-level security network 10 as shown may provide a defense-in-depth solution for voice communications across secure network domains 16a and 16b of an multi-level security architecture. Analog voice bridge 14 provides at least one layer of protection by allowing voice signals to pass while restricting passage of data packets between secure network domains 16a and 16b. Network switches 16a and 16b configured on either end of analog voice bridge 14 provide another level of protection by restricting data packets of their respective secure network domains 12a and 12b from accessing analog voice bridge 14 that are not intended for voice communication through analog voice bridge 14. Packet filters 20a and 20b and voice interface gateways 22a and 22b provide yet another level of protection by restricting access of terminals 18 and users of those terminals 18 to only those having sufficient authorization to access analog voice bridge 14. Additionally, the various elements of multi-level security network 10 may be configured with other features to provide other levels of protection for ensuring that the integrity of secure network domains 12a and 12b are not compromised while implementing voice communications on multi-level security network 10.

Each codec 24a and 24b of analog voice bridge 14 converts data packets from its respective secure network domain 12 to or from an analog voice stream suitable for transmission across analog voice line 26. An example codec 24a or 24b may include an analog to digital converter (ADC) for converting the analog voice stream to digital signal stream, a digital to analog converter (DAC) for converting the digital signal stream to the analog stream, and associated logic for encapsulating or decapsulating the analog voice stream to or from the digital signal stream in packets suitable for transmission over secure network domains 12a and 12b. Codec 24a and 24b may also be coupled to one another through one or more signaling lines 28 that control operation of analog signal lines 26, such as providing call setup, call teardown, or other call negotiation procedures.

In one embodiment, codec 24a and 24b are configured on separate computing systems and coupled together only through analog voice lines 24 and signaling lines 28 such that physical separation according to PL4 requirements may be maintained. Computing systems embodying codec 24a and 24b may be commercial-off-the-shelf computing systems capable of operating with a standard operating system, such as a Unix, Linux, Windows, or Macintosh operating system. Various elements of codec 24a and 24b will be described in greater detail below.

Each voice interface gateway 22a and 22b may include a codec for converting analog voice signals to and from a data packet stream suitable for transmission over secure network domains 12a and 12b, which may be, for example, an Ethernet network. In one embodiment, the codec configured in voice interface gateway 22 may be similar in design and construction to codec 24a and 24b of analog voice bridge 14. In one embodiment, voice interface gateway 22 includes a commercially available computing system configured with multiple codec 24a and 24b and marketed under the tradename "Mercury Interface Unit", which is available from Trilogy Communications Limited, and located in Andover, Hampshire, United Kingdom.

In one embodiment, analog voice line 26 comprises a pair of electrical conducting wires that convey analog voice signals whose voltage is proportional to its amplitude. In other embodiments, analog voice line 26 may include other types of signaling techniques that convey analog voice signals from codec 24a to and from codec 24b. For example, multiple analog voice signals may be multiplexed with one another on analog voice line using a time division multiplex access (TDMA) multiplexing technique. As another example, analog voice line 26 may convey a digital signal stream, such as a T1 signal forming a digital representation of the analog voice signal.

Voice interface gateway 22 communicates information from terminals 18 to network switch 16 in any suitable manner. In one embodiment, voice interface gateway 22 communicates signaling information with terminals 18 using the transfer control protocol/Internet protocol (TCP/IP) and transfers digital voice signals through secure network domains 12a or 12b using a Real-Time Protocol (RTP) and Session Initiation Protocol (SIP).

Each packet filter 20a and 20b is coupled between computer system 40 of terminal 18 and voice interface gateway 22. Packet filters 20a and 20b restrict access by terminal 18 to only those packets that are destined for voice communication. In many respects, packet filters 20a and 20b may perform functions that are generally similar to a commercial-off-the-shelf firewall. In one embodiment, each packet filter 20a and 20b may store an access control list that includes information associated with terminals 18 approved for voice communication through analog voice bridge 14. Thus, packet filters 20a and 20b may provide another layer of protection for analog voice bridge 14 by implementing a positive inclusion mandatory access control (MAC) policy in which only those terminals 18 that are pre-registered for use via the access control list in packet filter 20a and 20b may be allowed to communicate through voice interface gateway 22.

Packet filters 20a and 20b may be executed on any suitable computing system. For example, packet filter 20a and 20b may be executed on a stand-alone computing system that is separate and distinct from computer system 40 of terminal 18 or voice interface gateway 22. As another example, packet filter 20a and 20b may be integrated with computer system 40 or voice interface gateway 22 in which data packets may be transferred between packet filter 20a and 20b and computer system 40 or voice interface gateway 22 internally.

Figure 2:
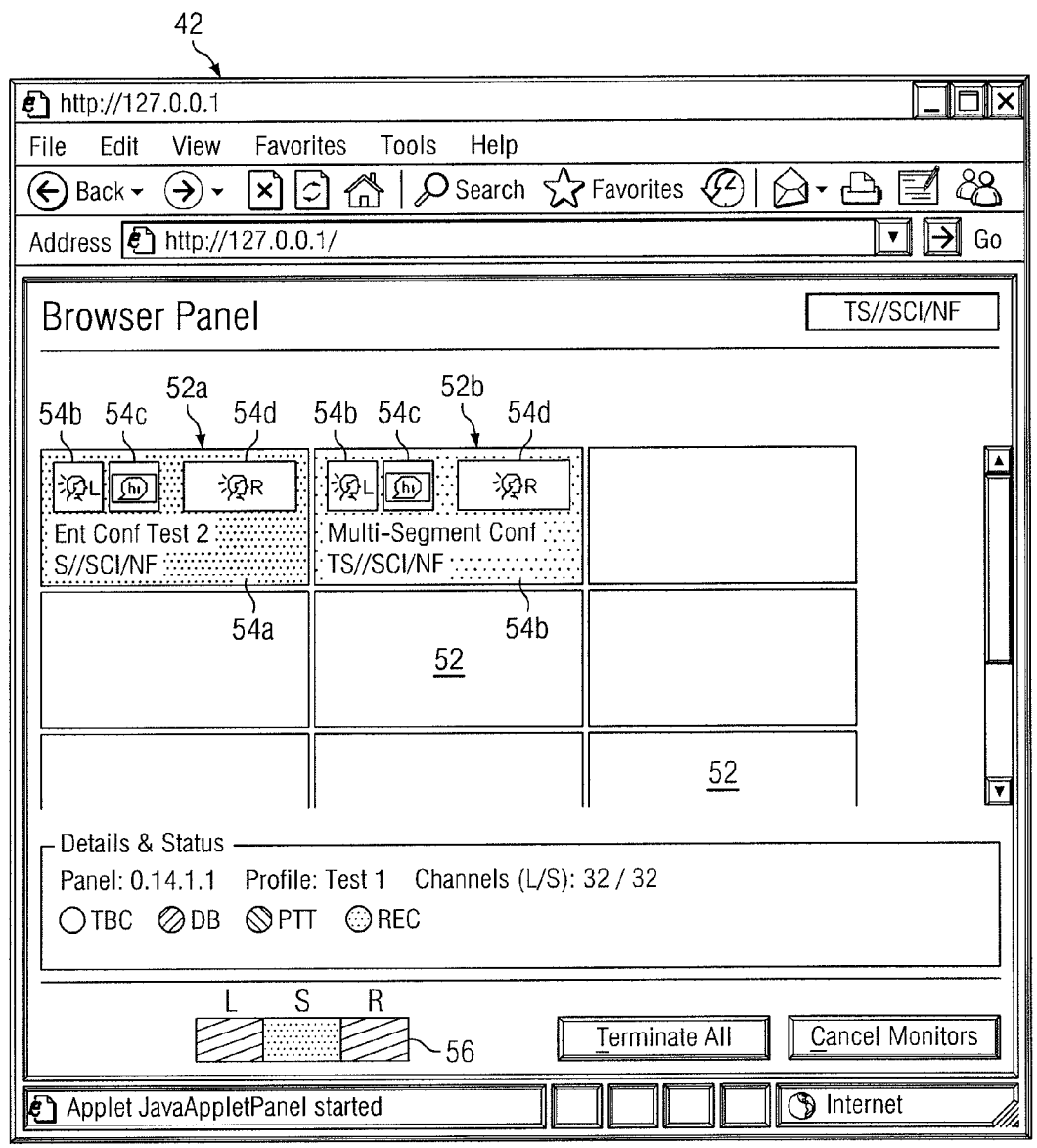
FIG. 2 is a screenshot showing one embodiment of a user interface of the computer system of FIG. 1.

FIG. 2 is a screenshot showing one embodiment of a user interface 42 of the computer system 40 of FIG. 1. As shown, user interface 42 comprises a browser window executing voice terminal program 44 that performs the various functions of its associated terminal 18, such as authorization of the user on terminal 18, authorization of terminal 18a on multi-level security network 10, call setup, call teardown, and/or other control sequences used to administer active voice sessions, such as push-to-talk signaling used with intercom voice sessions. In other embodiments, user interface 42 may be any suitable type of interface having one or more indicators for indicating the security level of active voice sessions to the user.

User interface 42 displays multiple cells 52 that are arranged in columns and rows. Each cell 52 displays indicators 54 representative of the security level of active voice sessions that have been established with its associated terminal 18a. For example, cell 52a includes an alpha-numeric text field indicator 54b describing the name and security level of the connected remote terminal 18. Cell 52a is also filled with a color indicator, which is in this case dark gray, to indicate the "seceret" security level of the connected remote terminal 18 to the user. Cell 52b also includes an alpha-numeric text field indicator 54b describing the name and security level of the connected remote terminal 18, Cell 52a is also filled with a color indicator, which is in this case light gray, to indicate the "top secret" security level of another connected remote terminal 18 to the user.

Indicators 54 may have any visual form that may be used to visually difffferentiate from among the differing security levels. For example, indicators 54 may display differing colors corresponding to differing security levels. As another example, indicators 54 may include differing patterns, such as cross-hatching, or other shading pattern to differentiate from among the differing security levels.

Terminals 18 may establish an intercom connection among one another such that more than two terminals 18 may communicate simultaneously. In some embodiments, indicators 54 may provide a visual indication of the security level associated with each connected terminal 18. In one embodiment, indicators 54 may be dynamically modified as remote terminals are added or removed from the intercom connection. For example, a particular terminal 18 having a "secret" security level may join an ongoing intercom connection of other terminals 18 having a "top secret" security level. Once the particular terminal 18 joins, indicators 54 of the other terminals 18 having the "top secret" security level may be automatically lowered from "top secret" to "secret" to indicate to its users that the security level of the intercom connection has been lowered to the "secret" level. Conversely, when the particular terminal 18 leaves the intercom connection, indicators 54 of the other terminals 18 having the "top secret" security level may be automatically raised again to indicate a "top secret" security level to its users. Thus, indicators 54 of each terminal 18 of the intercom session may indicate the security level of the user having the lowest security level.

In one embodiment, each cell 52 displays a left ear indicator 54b, a speak indicator 54c, and a right ear indicator 54d that may be highlighted to indicate which remotely connected terminal 18 is coupled to the left earpiece, the microphone, and the right earpiece of the headset 38. Thus, the user of terminal 18 may be provided with a visual indication as to which remotely coupled terminal 18 is speaking into his or her left ear, right ear, and to which remotely coupled terminal 18 is receiving voice signals generated from the microphone. As an example, the user may wish to listen to voice signals received from the remote terminal 18 represented by cell 52*a* and speak to the remote terminal 18 represented by cell 52*b* in which the user may actuate the left ear indicator 54*a* and right ear indicator 54*c* of cell 52*a*, and the speak indicator 54*b* of cell 52*b* may be actuated. Voice terminal program 44 may respond by highlighting the left ear indicator 54*a* and right ear indicator 54*c* of cell 52*a*, and the speak indicator 54*b* of cell 52*b*. This configuration may be modified at any time during the active voice sessions by actuating different left ear indicators 54*b*, speak indicators 54*c*, and right ear indicators 54*d* of other cells 52.

User interface 42 may also display a security level summary window 56 that indicates the lowest security level to which terminal 18*a* or 18*b* is connected. In the particular embodiment shown, security level summary window 56 includes three cells corresponding to the left earpiece, microphone, and right earpiece of headset 38.

Console 32 provides user configuration of its associated network switch 16*a* and 16*b* and may provide various features for ensuring proper operation of analog voice bridge 14. In one embodiment, console 32 may monitor voice connections communicated through analog voice bridge 14 to ascertain any suspicious activity that may occur through illicit use. For example, console 32 may monitor signaling lines 28 for abnormal signaling sequences that may be attempted, such as repeated call setup attempts in an inordinately short period of time, or other call setup attempts to terminals 18 for which the calling terminal 14 may not be authorized to call. If suspicious activity is detected, console 32 may generate an alarm message that is sent to an appropriate system administrator for further investigation. In one embodiment, console 32 may also include a voice recording mechanism, such as a Stancil recorder or other similar device, that selectively records voice communications transmitted across analog voice bridge 18 for review at a later time. For example, it may be determined through various means that a particular user has been illicitly transmitting or receiving voice communications through analog voice bridge 14. Thus, console 32 may be configured to record further voice communications of that user through analog voice bridge 14 and analyzed at a later time to determine the nature of the communications conducted through analog voice bridge 14.

In one embodiment, console 32 may audit voice communications through analog voice bridge 14. For example, console 32 may perform periodic audits of some or all terminals 14 that access other terminals 18 through analog voice bridge 14. These audits may reveal certain patterns of voice call activity that may deviate from normal accepted usage. In this case, console 32 may generate an alarm message that is sent to an appropriate system administrator for further investigation.

Figure 3:
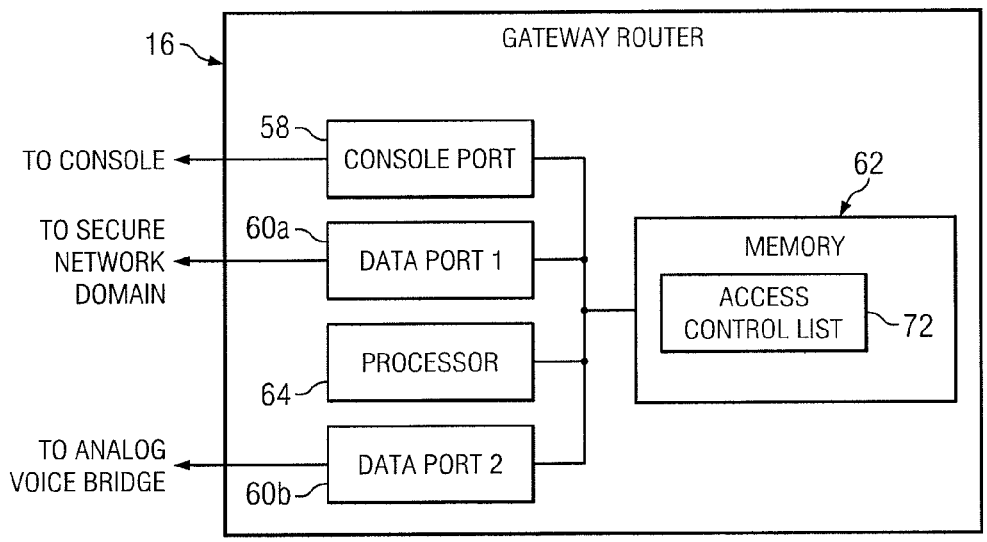
FIG. 3 is a diagram showing several elements of one embodiment of one network switch of FIG. 1.

FIG. 3 is a diagram showing several elements of one embodiment of one network switch 16 of FIG. 1. Network switch 16 includes a console port 58, two data ports 60*a* and 60*b*, a memory 62, and a processor 64 coupled as shown. Memory 62 includes a monitoring tool 66, an auditing tool 68, and an accounting tool 70 that may be executed by processor 64. Memory 62 also includes an access control list 72 that may be configured by console 32 to include those terminals 18 that may establish voice connections through analog voice bridge 14. In the particular embodiment shown, network switch 20 switches data packets at the network layer (layer 3) of the open system interconnect (OSI) model.

Network switch 16 restricts transmission of data packets between its associated secure network domain 12 and analog voice bridge 14 to only those data packets associated with digitized voice streams that are destined for transmission through analog voice bridge 14. In one embodiment, each network switch 16 restricts all data packets to analog voice bridge 14 that have not originated from a voice interface gateway 22 configured on its associated secure network domain 12. Thus in certain embodiments, security of the boundary formed by analog voice bridge 14 may be enhanced by restricting access from other nodes that may be coupled to its associated secure network domain 12.

Network switch 16 provides various functions for maintaining security of its respective secure network domain 12. In one embodiment for example, access control list 72 is configurable only by a console 32 coupled through console port 58. By limiting configuration only through console 32, configuration of access control list 72 from remotely coupled devices may be restricted. In this manner, illicit access across secure network domains 12 provided by reconfiguration of access control list 72 may be effectively mitigated or eliminated. Without this feature, for example, a particular node coupled to network switch 16 through its respective secure network domain 12 may be able to gain illicit access to the other secure network domain 12 by remotely configuring access control list 72 to allow unauthorized access to the other secure network domain 12 through analog voice bridge 14.

Network switch 20 uses access control list 58 to regulate access of terminals 14 to analog voice bridge 18. In one embodiment, network switch 20 implements a mandatory access control (MAC) such that only those terminals 14 previously registered in access control list 58 are allowed to place or receive intercom calls through analog voice bridge 18.

Figure 4:
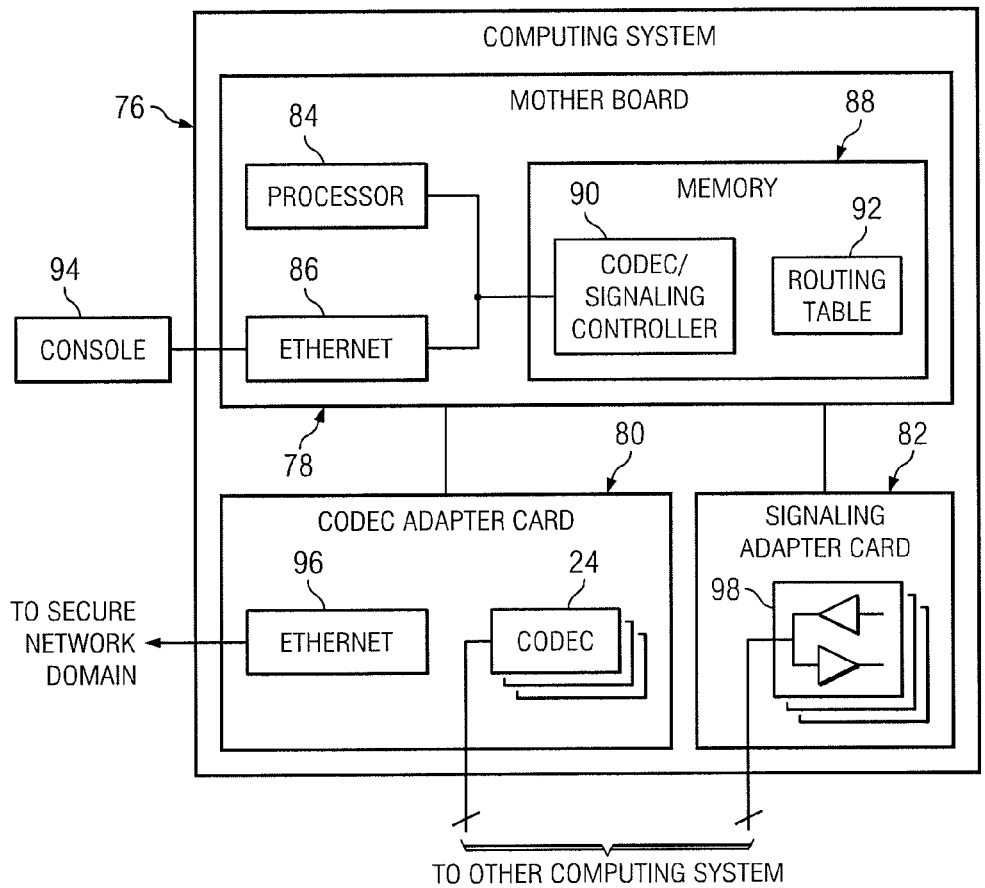
FIG. 4 is a diagram showing an example computing system that may be implemented with one or more codecs of FIG. 1.

FIG. 4 is a diagram showing an example computing system 76 that may be implemented with one or more codecs 24 of FIG. 1. Computing system 76 includes a motherboard 78 coupled to a codec adapter card 80 and a signaling adapter card 82 through a suitable type of computer bus, such as a peripheral component interconnect (PCI) or an industry standard architecture (ISA) computer bus. Motherboard 78 has a processor 84 coupled to an Ethernet port 86 and a memory 88 that stores a codec/signaling controller 90 and a routing table 92. Ethernet port 86 is coupled to a console 94 for configuration of routing table 92. Although only one computing system 76 implemented with codec 24 is shown, it should be understood that codec 24 may be implemented in another computing system similar in design and construction to computing system 76 shown and described.

Processor 84 executes codec/signaling controller 90 to control codec adapter card 80 and signaling adapter card 82 for implementing the various features of analog voice bridge 14. In one embodiment, computing system 76 is a commercial-off-the-shelf computing system capable of operating with a standard operating system, such as a Unix, Linux, Windows, or Macintosh operating system. In a particular embodiment, computing system 76 is a commercially available computing system configured with multiple codecs 24 and marketed under the tradename "Mercury Interface Unit", which is available from Trilogy Communications Limited, and located in Andover, Hampshire, United Kingdom.

Routing table 92 stores routing information about terminals 18 that communicate through analog voice bridge 14.

Additionally, routing table 92 stores routing information about terminals 18 that communicate through analog voice bridge 14. Two computing systems 76 embodying each codec 24a and 24b (FIG. 1) of analog voice bridge 14 may have their own routing table 92a and 92b such that registration of a communication link between terminals 18a and 18b configured on differing secure network domains 12a and 12b may be conducted independently of one another. Routing tables 92 may be configured according to a positive inclusion policy. That is, the only voice connections allowed through analog voice bridge 14 are those that have been previously registered on the routing tables 92 of both computing systems 76 embodying codecs 24 of analog voice bridge 14.

In one embodiment, codec adapter card 80 may include one or more codecs 24 for providing multiple voice connections between secure network domains 24 simultaneously. Codec adapter card 80 also includes a dedicated Ethernet port 96 that receives and transmits digital voice packets from its respective secure network domain 12. Providing an Ethernet port 96 separate from Ethernet port 86 may provide certain advantages including separation of voice traffic from configuration data packets used to configure the operation of codec/signaling controller 90. Providing Ethernet port 96 separately from Ethernet port 86 may also provide another advantage in that its coupling to codecs 24 may be provided without connection through the computing system's computer bus connectors that may otherwise reduce throughput and/or signal quality of voice signals transferred between codecs 24 and Ethernet port 96.

In one embodiment, routing table 92 is only locally configurable using console 94. That is, modification of routing table 92 may be restricted from other access points of computing system 76, such as Ethernet port 96 that would otherwise allow its modification through another node remotely configured on its associated secure network domain 12. In this manner, illicit access across secure network domains 12 enabled by modification of routing table 92 may be effectively mitigated or eliminated. Without this feature, for example, a particular node coupled to computing system 76 through its respective secure network domain 12b (FIG. 1) may be able to gain illicit access to the other secure network domain 12a by remotely configuring routing table 92 to allow unauthorized access to the other secure network domain 12b through analog voice bridge 14.

Signaling adapter card 82 includes one or more I/O ports 98 for transferring logic signals with signaling adapter card of its complementary computing system. Logic signals may include any suitable quantity and/or sequence of signals associated with voice connections across analog voice bridge 14, such as calling sequences associated with a conference call session, or push-to-talk signaling used within conference call sessions. For example, codec/signaling controller 90 may receive a call request from terminal 18 configured on secure network domain 12a requesting a conference call session with terminal 18 configured on secure network domain 12b. In response to the call request, codec/signaling controller 90 controls I/O ports 98 to generate logic signals that are transmitted to I/O ports 98 of its complementary computing system for setting up a conference call with terminal 18. Codec/signaling controller 90 of the complementary computing system 76 processes the received logic signals to initiate the conference call session with terminal 18. In one embodiment, generation of logic signals through I/O ports 98 is restricted to control only by codec/signaling controller 90. That is, the operation of I/O ports 98 may not be manipulated through instructions or messages received through Ethernet port 86, Ethernet port 96, or other communication interface provided on computing system 76. In this manner, the security boundary provided between secure network domains 12a and 12b may not be breeched by performing illicit call signaling techniques from one computing system 76 to the other.

Figure 5:
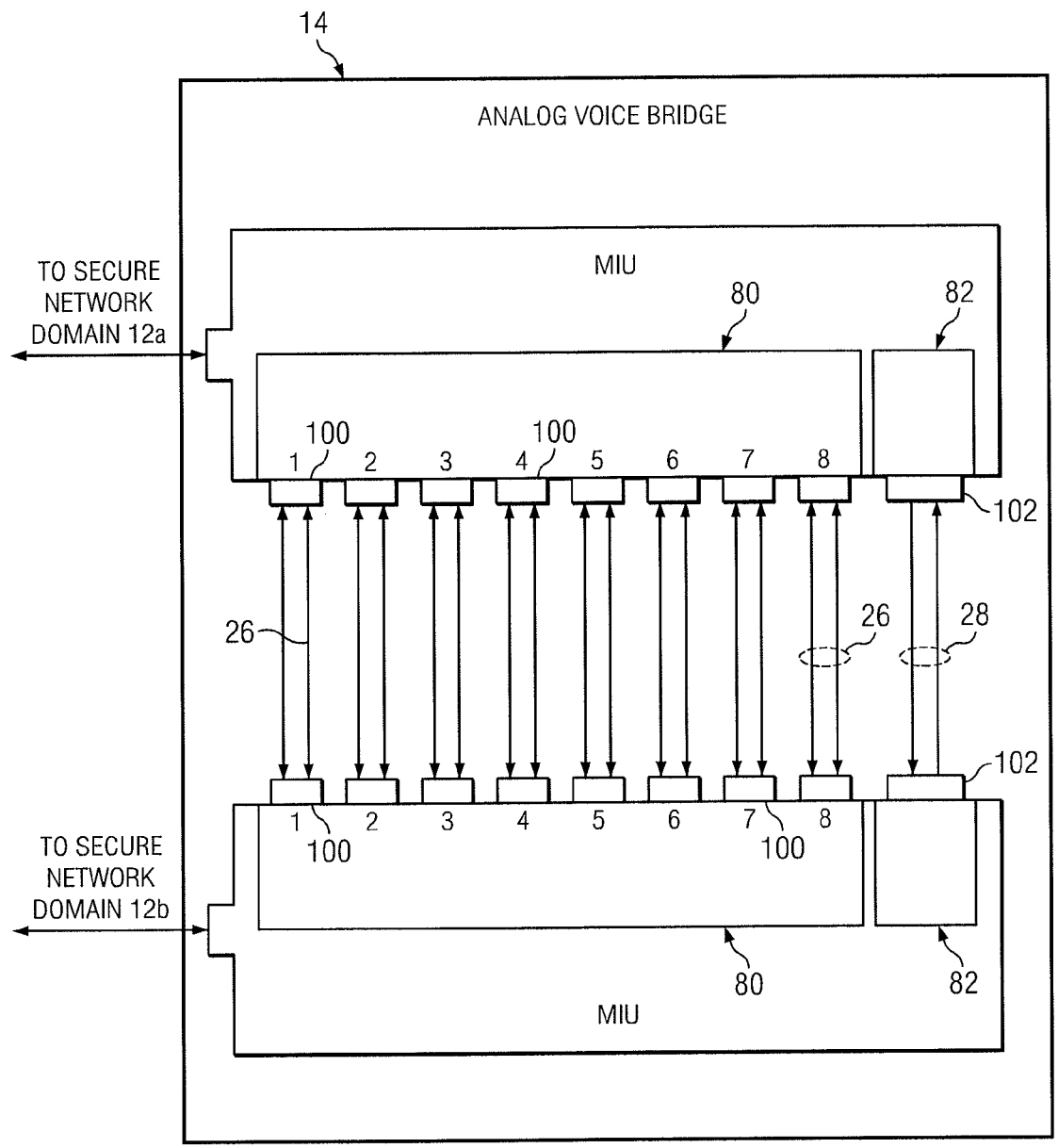
FIG. 5 is a schematic diagram showing one embodiment of multiple analog voice lines and signaling lines that may be configured to route analog voice signals and signaling, respectively between the computing systems of FIG. 1.

FIG. 5 is a schematic diagram showing one embodiment of multiple analog voice lines 26 and signaling lines 28 that may be configured to route analog voice signals and signaling, respectively between computing systems 76. Codec adapter card 80 and signaling adapter card 82 each include one or more connectors 100 and 102, respectively, for physical interconnection with analog voice lines 26 and signaling lines 28. In one embodiment, computing systems 76 embodying codecs 24 are configured in relatively close proximity to each other such that interconnection of analog voice lines 26 between computing systems 76 may be closely controlled. In one embodiment, analog voice lines 26 may be void of any active circuitry, such as busses, routers, or amplifiers that may increase their complexity and thus increase the possibility of an incorrect connection between computing systems 76. In another embodiment, analog voice lines 26 and signaling lines 28 are color coded to match a color coding scheme of their associated connectors 100 and 102. For the example shown in which codec adapter card includes eight connectors 100, each connector 100 of codec adapter card 80 may be labeled with one of a black, brown, red, orange, yellow, green, blue, or violet colored label. Correspondingly, each of eight analog voice lines 26 may be labeled with similar individual colored labels. Using this color coding scheme, the possibility of inadvertent mismatch of analog voice lines 26 between computing system 76 may be reduced or eliminated.

Modifications, additions, or omissions may be made to analog voice bridge 14 without departing from the scope of the disclosure. The components of analog voice bridge 14 may be integrated or separated. For example, the components of codec adapter card 80 and/or signaling adapter card 82 may be implemented on a separate circuit card as shown or may be implemented with the other Moreover, the operations of analog voice bridge 14 may be performed by more, fewer, or other components. For example, computing systems 76 may each be configured with a hardware of software firewall to further restrict access to analog voice lines 26 and/or signaling lines 28 between the two secure network domains 12a and 12b. Additionally, operations of codec/signaling controller 90 may be performed using any suitable logic comprising software, hardware, and/or other logic.

Figure 6:
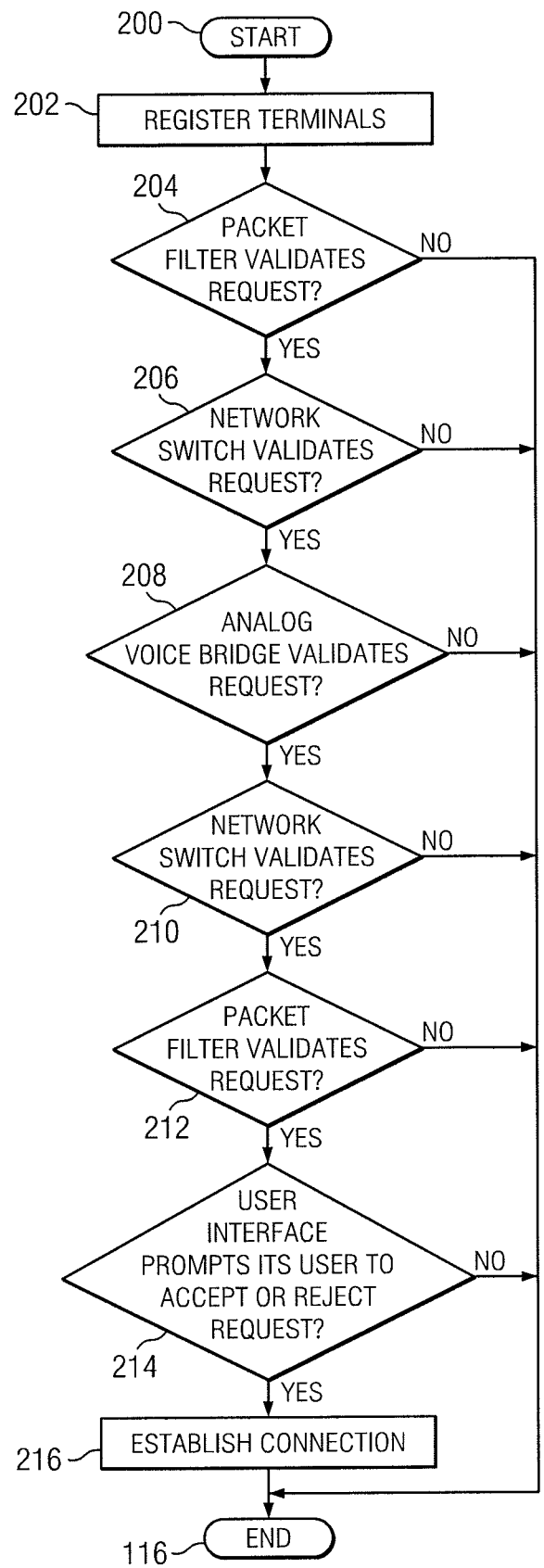
FIG. 6 is a flowchart showing one embodiment of a series of actions that may be performed by multi-level security network of FIG. 1 to provide relatively secure voice communications across the security boundary formed by the analog voice bridge.

FIG. 6 is a flowchart showing one embodiment of a series of actions that may be performed by multi-level security network 10 to provide relatively secure voice communications across the security boundary formed by analog voice bridge 14. In act 200, the process is initiated.

In act 202, terminals 18a and 18b configured on each secure network domain 12a and 12b are registered for use on multi-level security network 10. Each terminal 18a and 18b may be registered for use in their respective secure network domains 12a and 12b by adding information associated with each terminal 18a and 18b in access control list 72 of its associated network switch 16a and 16b and the access control list configured in its associated packet filter 20a and 20b. In one embodiment, terminals 18a and 18b may also be registered for use by adding information associated with each terminal 18a and 18b in routing tables 92 associated with both codecs 24 configured in analog voice bridge 10.

Registration of terminals 18a and 18b may include an authentication, authorization scheme for themselves as well as an authentication, authorization scheme for the user of terminals 18a and 18b. In one embodiment, authorization of the user of a terminal 18a or 18b may include validation of the user to use that particular terminal 18a or 18b. For example, a particular user having a security clearance level of secret may attempt to access a particular terminal 18a configured on a top secret secure network domain 12a. Thus, analog voice bridge 14 may reject the communication attempt due to lack of proper authorization of the user with that particular terminal 18a.

Registration of terminals 18a and 18b using routing tables 92 associated with each codec 24a and 24b provides a positive inclusion policy in which only voice sessions that have been previously registered may be allowed to communicate through analog voice bridge 14. Routing table 92 may include information associated with terminals 18a configured on its secure network domain 12a, and terminals 18b coupled to the other secure network domain 12b. In one embodiment, registration of terminals 18a and 18b on each routing table 92 is only modifiable through a locally configured console 32. That is, modification of routing tables 92 through a remote node that is remotely configured on secure network domain 12a or 12b may be restricted.

In one embodiment, routing tables 92 associated with each secure network domain 12a and 12b are manually modified by an information system security officer (ISSO) responsible for his or her secure network domain 12a or 12b. In this manner, registration of communication sessions through analog voice bridge 14 may be registered while maintaining physical separation of secure network domains 12a and 12b from one another. For example, it may be desired to provide a voice communication path from a terminal 18a configured on secure network domain 12a with another terminal 18b configured on the other secure network domain 12b. Following registration of terminals 18a and 18b with their associated secure network domains 12a and 12b as described with reference to act 202, the information system security officers responsible for secure network domain 12a may modify their associated routing table 92 and communicate the desired voice communication path to the other information system security officer responsible for the other secure network domain 12b. The other information system security officer may then modify the routing table 92 associated with secure network domain 12b in analog voice bridge 14.

In act 204, packet filter 20 validates a connection request from terminal 18a. Packet request may validate the connection request in any suitable manner. In one embodiment, packet filter 20a validates the connection request according to a type of terminal 18a issuing the request. For example, packet filter 20a may forward only those connection requests that have originated from a particular browser application executed on computing system 76 of terminal 18a. In another embodiment, packet filter 20a validates the connection request according to information associated with that particular terminal 18a stored in its access control list. If the connection request is validated by packet filter 20a, processing continues at act 206; otherwise the connection request is terminated and processing ends in act 216.

In act 206, network switch 16a receives the connection request from voice interface gateway 22a and validates the connection request. Network switch 16a validates the connection request in any suitable manner. In one embodiment, network switch 16a validates the connection request according to information stored in its access control list 72a associated with the terminal 18a issuing the connection request. If the connection request is validated by network switch 16a, processing continues at act 208; otherwise the connection request is terminated and processing ends in act 216.

In act 208, analog voice bridge 14 receives the connection request from network switch 16a and validates the connection request according to routing table 92 associated with secure network domain 12a. If the connection request is validated in routing table 92, computing system 76 transmits, using signaling lines 28, the connection request to the other computing system 76 of analog voice bridge 14. Computing system 76 may then verify that terminal 18a configured on its secure network domain 12a has been registered to communicate with other terminal 18b configured on secure network domain 12b. In one embodiment, computing systems 76 may use a proprietary signaling protocol to communicate through signaling lines 28. In this manner, spoofing of connection requests transmitted through analog voice bridge 14 may be reduced or eliminated. In another embodiment, signaling lines 28 are restricted to convey only information necessary for establishing, maintaining, or tearing down voice connections through analog voice bridge 14. Thus, signaling lines 28 may be restricted from transferring any information, such as data packets, from one computing system 76 to the other. If the connection request is validated by both computing systems 76, an unused analog voice line 26 may be allocated for conveying analog voice signals between terminals 18a and 18b in which processing continues at act 210. If the connection request is not validated, the connection request is terminated and processing ends in act 216.

In act 210, network switch 16b receives the connection request from analog voice bridge 14 and validates the connection request according to the receiving terminal 18b. In one embodiment, network switch 16b validates the connection request according to information stored in its access control list 72 associated with the terminal 18b coupled to its associated secure network domain 12b. If the connection request is validated by network switch 16b, processing continues at act 212; otherwise the connection request is terminated and processing ends in act 216.

In act 212, packet filter 20b validates a connection request received from network switch 16b. Packet filter 20b validates the connection request in any suitable manner. In one embodiment, packet filter 20b validates the connection request according to a type of receiving terminal 18b receiving the connection request. In another embodiment, packet filter 20b validates the connection request according to information associated with that particular terminal 18b stored in its access control list. If the connection request is validated by packet filter 20b, processing continues at act 214; otherwise the connection request is terminated and processing ends in act 216.

In act 214, user interface 42 prompts its user to accept or reject the incoming connection request from packet filter 20b. The connection request may alternatively be accepted or rejected by a user of terminal 18b in any suitable manner. For example, the user of terminal 18b may reject the connection request by ignoring the connection request, or may accept the connection request by actuating terminal 18b in a manner that causes the various elements of multi-level security network 10 to establish a voice connection between terminal 18a and terminal 18b. If the connection request is accepted by the user of terminal 18b, processing continues at act 216; otherwise the connection request is terminated and processing ends in act 216.

In act 216, the connection is established and voice communications may be conducted from terminal 18a to terminal 18b. Once the connection is established, users of terminals 18a and terminal 18b may conduct a secure voice communication with one another through analog voice bridge 14. When voice communication between terminals 18a and 18b are no longer needed or desired, the voice connection is removed and the process ends in act 216.

Any suitable type of connection may be established through multi-level security network 10. In one embodiment, terminal 18a may attempt to initiate an intercom connection in which ensuing voice messages with terminal 18b may be provided by a push-to-talk (PTT) voice message transmission scheme. Using the PTT voice message transmission scheme, voice messages originating at one terminal 18a or terminal 18b may be transmitted in half-duplex fashion to the other terminal 18b or 18a at the push of a button configured on the transmitting terminal 18a and 18b. In another embodiment, voice transmissions across multi-level security network 10 using a "hot mic" voice message transmission scheme may be restricted. The term "hot mic" voice message transmission scheme generally refers to transmission of voice messages over an intercom connection without manually operating a physical actuation device, such as a terminal mounted button. By restricting the use of "hot mic" voice message transmission schemes, therefore, the possibility of inadvertent voice transmission across security boundaries may be reduced or eliminated.

Modifications, additions, or omissions may be made to the method without departing from the scope of the disclosure. The method may include more, fewer, or other acts. For example, voice interface gateways 22a and 22a may include one or more voice compression/decompression algorithms for converting analog voice signals generated by terminals 18a and 18b into another form that may be transmitted over multi-level security network 10 at a reduced bandwidth. As another example, network switch 16a or 16b may execute any suitable auditing, monitoring, or accounting procedure for enhancing the security of voice communications transmitted between secure network domains 12a and 12b.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A computer program product comprising:
    executable code embodied on a non-transitory computer-readable medium, the nontransitory computer-readable medium, when operably coupled to a first computer system that is configured to display information on a user interface associated with a first terminal, the computer system coupled to a first secure network domain, enabling the computer system to execute the executable code so as to:
    establish and monitor a plurality of independent voice sessions, each respective independent voice session comprising a voice connection established between the first terminal and at least one other terminal selected from one or more of a plurality of second terminals on a second secure network domain, the second secure network domain being separate and distinct from the first secure network domain;
    display on the user interface, for each respective one of the plurality of independent voice sessions, a respective first indicator constructed and arranged to indicate the security level of the respective independent voice session, wherein each respective indicator remains on the user interface as long as the respective independent voice session exists;
    present on the user interface at least one communication type indicator, the communication type indicator corresponding to at least one communication type selected from left ear, right ear, and speak, wherein the communication type indicator designates on the user interface which type of communication a corresponding second terminal is having with a user of the first terminal, wherein:
    when the communication type indicator comprises left ear, then the communication type indicator identifies a first corresponding second terminal that is operably coupled to a left earpiece used by the operator of the first terminal;
    when the communication type indicator comprises right ear, then the communication type indicator identifies a second corresponding second terminal that is operably coupled to a right earpiece used by the operator of the first terminal; and
    when the communication type indicator comprises speak, then the second indicator identifies one or more third corresponding second terminals that are receiving voice signals generated by the operator of first terminal;
    present on the user interface, for the at least one communication type indicator, a corresponding security indicator, the corresponding security indicator configured to indicate a security level of the corresponding first, second or third corresponding second terminal that is associated with the communication type indicator; and
    dynamically modify each respective first indicator, during each respective independent voice session, to correspond to a change in the security level of the respective independent voice session that arises during the respective independent voice session.

2. The computer program product of claim 1, wherein the computer system further executes the executable code so as to:
    generate, for each respective independent voice session, second and third indicators on the user interface, wherein the second indicator indicates a first security level of the first terminal, and the third indicator indicates a second security level of the second terminal, and wherein the second and third indicators, respectively, continue to be displayed on the user interface during each respective independent voice session as long as the first terminal and second terminal, respectively, are connected to each respective independent voice session.

3. The computer program product of claim 2, wherein the executable code, when executed by the computer system, is operable to
    enable a third terminal in operable connection with one of the first secure network domain, second secure network domain, and a third secure network domain, the third secure network domain being separate and distinct from the first and second secure network domains, to join at least one existing independent voice session; and
    generate, for the at least one existing independent voice session, a fourth indicator on the user interface indicating the security level of the third terminal, wherein the fourth indicator remains on the user interface so long as the third terminal is connected to the existing independent voice session.

4. The computer program product of claim 2, wherein the code is further operable, for at least one existing respective independent voice session, to automatically change the second and third indicators, during the at least one existing respective independent voice session, such that each indicator represents a security level that is no higher than the lower of the security level of the first terminal and the security level of the second terminal.

5. The computer program product of claim 3, wherein the executable code, when executed by the computer system, is operable to;
   detect when one of the first, second, and third terminals has left the at least one existing respective independent voice session; and
   dynamically modify the first indicator, during the at least one existing respective independent voice session, to correspond to any changes in the security level of the at least one existing respective independent voice session resulting from one of the first, second, and third terminals leaving the at least one existing respective independent voice session.

6. The computer program product of claim 1, wherein the first secure network domain and the second secure network domain are configured in a multi-level security architecture.

7. The computer program product of claim 1, wherein the executable code, when executed by the computer system, is further operable to implement a positive inclusion mandatory access control (MAC) policy by authenticating only pre-registered users of the executable code.

8. The computer program product of claim 1, wherein a first security level of the first secure network domain is different from a second security level of the second secure network domain.

9. The computer program product of claim 1, wherein the code is further operable to define the security level of at least one respective independent voice session based at least in part on the security levels of each respective terminal connected to the at least one respective independent voice session, wherein the security level of the at least one respective independent voice session is dynamically configured, during the at least one respective independent voice session, to be no higher than the lowest security level of the security levels of all terminals connected to the at least one respective independent voice session.

10. The computer program product of claim 1, wherein the first indicator further comprises information indicating a security level of at least one of the first and second terminals.

11. The computer program product of claim 1, wherein the executable code, when executed by the computer system, is operable to:
   configure the first and second terminals to communicate during the at least one respective independent voice session using one or more packet streams, each packet stream comprising at least one of an analog voice signal portion and a non-voice signal portion, the non-voice signal portion comprising a data signal comprising non-voice data and including no analog voice signals; and
   restrict the communication of data signals between the first and second secure network domains to carry only the analog voice signal between the first and second network domains and to restrict communication of the data signal.

12. A computer implemented method comprising:
   establishing and monitoring a plurality of independent voice sessions, each respective independent voice session comprising a voice connection established between a first terminal configured on a first secure network domain and a second terminal configured on a second secure network domain, the second secure network domain being separate and distinct from the first secure network domain;
   generating, on a user interface associated with the first terminal, for each respective one of the plurality of independent voice sessions, a respective first indicator configured to indicate the security level of the first respective independent voice session, wherein each respective first indicator remains on the user interface during the respective independent first voice session;
   presenting on the user interface at least one communication type indicator, the communication type indicator corresponding to at least one communication type selected from left ear, right ear, and speak, wherein the communication type indicator designates on the user interface which type of communication a corresponding second terminal is having with a user of the first terminal, wherein:
      when the communication type indicator comprises left ear, then the communication type indicator identifies a first corresponding second terminal that is operably coupled to a left earpiece used by the operator of the first terminal;
      when the communication type indicator comprises right ear, then the communication type indicator identifies a second corresponding second terminal that is operably coupled to a right earpiece used by the operator of the first terminal; and
      when the communication type indicator comprises speak, then the second indicator identifies one or more third corresponding second terminals that are receiving voice signals generated by the operator of first terminal;
   presenting on the user interface, for the at least one communication type indicator, a corresponding security indicator, the corresponding security indicator configured to indicate a security level of the corresponding first, second or third corresponding second terminal that is associated with the communication type indicator; and
   dynamically modifying each respective first indicator, during each respective independent voice session, to correspond to a change in the security level of the respective independent voice session that arises during the respective independent voice session.

13. The computer implemented method of claim 12, further comprising:
   generating, for at least one respective independent voice session, second and third indicators on the user interface, wherein the second indicator indicates a first security level of the first terminal, and the third indicator indicates a second security level of the second terminal, wherein the second and third indicators, respectively, continue to be displayed on the user interface during the at least one respective independent voice session as long as the first terminal and second terminal, respectively, are connected to the at least one respective independent voice session.

14. The method of claim 13, further comprising dynamically changing, for at least one respective independent voice session, the second and third indicators, during the at least one respective independent voice session, to ensure that the second and third indicators each represents a security level that is no higher than the lowest security level of all terminals connected to the at least one respective independent voice session.

15. The computer implemented method of claim 12, wherein the first secure network domain and the second secure network domain are configured in a multi-level security architecture.

16. The computer implemented method of claim 12, further comprising:
   enabling a third terminal in operable connection with one of the first secure network domain, second secure network domain, and a third secure network domain, the third secure network domain being separate and distinct from the first and second secure network domains, —to join at least one existing independent voice session from the plurality of independent voice sessions; and generating, for the at least one existing independent voice session, a fourth indicator on the user interface indicating the security level of the third terminal, wherein the fourth indicator remains on the user interface so long as the third terminal is connected to the at least one existing independent voice session.

17. The method of claim 16, further comprising:

detecting, for the at least one existing independent voice session, when one of the first, second, and third terminals has left the at least one existing independent voice session; and dynamically modifying the first indicator, during the at least one existing independent voice session, to correspond to any changes in the security level of the at least one existing respective independent voice session resulting from one of the first, second, and third terminals leaving the at least one existing independent voice session.

18. The computer implemented method of claim 12, further comprising implementing a positive inclusion mandatory access control (MAC) policy by authenticating only pre-registered users of the executable code.

19. The computer implemented method of claim 12, wherein a first security level of the first secure network domain is different from a second security level of the second secure network domain.

20. The method of claim 12, further comprising defining the security level of at least one respective independent voice session based at least in part on the security levels of each respective terminal connected to the at least one respective independent voice session, wherein the security level of the at least one respective independent voice session is dynamically configured, during the at least one respective independent voice session, to be no higher than the lowest security level of the security levels of all terminals connected to the at least one respective independent voice session.

21. The method of claim 12, wherein the first indicator further comprises information indicating the security level of at least one of the first and second terminals.

22. The computer implemented method of claim 12, further comprising:

configuring the first and second terminals to communicate during the at least one respective independent voice session using one or more packet streams, each packet stream comprising at least one of an analog voice signal portion and a non-voice signal portion, the non-voice signal portion comprising a data signal comprising non-voice data and including no analog voice signals; and restricting the communication of data signals between the first and second secure network domains to carry only the analog voice signal between the first and second network domains and to restrict communication of the data signal.

23. A system, comprising:

a user interface capable of displaying a plurality of respective first indicators corresponding to a plurality of respective independent voice sessions, wherein each indicator is indicative of at least one security level of a plurality of security levels, each respective first indicator corresponding to a security level of a respective independent voice session;

a computer system comprising at least one processor implemented at least partially in hardware in operable communication with the user interface, the computer system configured to:

establish the plurality of independent voice sessions, each respective independent voice session comprising a voice connection established between a first terminal configured on a first secure network domain, the first terminal in operable communication with the user interface, and at least one other terminal selected from a plurality of second terminals configured on a second secure network domain, the second secure network domain being separate and distinct from the first secure network domain;

configure the appearance of each respective the first indicator on the user interface to indicate the security level of the corresponding respective independent voice session, wherein each respective first indicator remains on the user interface during the respective independent voice session;

present on the user interface at least one communication type indicator, the communication type indicator corresponding to at least one communication type selected from left ear, right ear, and speak, wherein the communication type indicator designates on the user interface which type of communication a corresponding second terminal is having with a user of the first terminal, wherein:

when the communication type indicator comprises left ear, then the communication type indicator identifies a first corresponding second terminal that is operably coupled to a left earpiece used by the operator of the first terminal;

when the communication type indicator comprises right ear, then the communication type indicator identifies a second corresponding second terminal that is operably coupled to a right earpiece used by the operator of the first terminal; and when the communication type indicator comprises speak, then the second indicator identifies one or more third corresponding second terminals that are receiving voice signals generated by the operator of first terminal;

present on the user interface, for the at least one communication type indicator, a corresponding security indicator, the corresponding security indicator configured to indicate a security level of the corresponding first, second or third corresponding second terminal that is associated with the communication type indicator; and dynamically modify the appearance of each respective first indicator, during the voice session, to correspond to a change in the security level of the respective independent voice session that arises during the respective independent voice session.

24. The system of claim 23, wherein the computer system is further configured to:

generate, for each respective independent voice session, second and third indicators on the user interface, the second indicator indicating a first security level of the first terminal and the third indicator indicating a second security level of the second terminal, and wherein the second and third indicators, respectively, remain on the user interface during each respective independent voice session as long as the first terminal and second terminal, respectively, are connected to each respective independent voice session.

25. The system of claim 24, wherein the computer system is further configured to dynamically change the second and third indicators, during each respective independent voice session, to ensure that the second and third indicators each represents a security level that is no higher than the lowest security level of all terminals connected to the at least one respective independent voice session.

26. The system of claim 23, wherein, the first and second terminals are configured to communicate during the at least one respective independent voice session using one or more packet streams, each packet stream comprising at least one of an analog voice signal portion and a non-voice signal portion, the non-voice signal portion comprising a data signal comprising non-voice data and including no analog voice signals; and wherein the system further comprises means for restricting communication of data signals between the first and second secure network domains, the means for restricting communication configured and arranged to carry only the analog voice signal between the first and second network domains and to restrict communication of the data signal.

27. The system of claim 26, wherein the means for restricting communication comprises at least one of:

an analog voice bridge configured to decapsulate analog voice information from the packet stream to allow the analog voice signal portion to be transmitted while restricting passage of the data signals;

a network switch configured to restrict any packet stream that comprise data signals from being communicated outside of the respective first or second secure network domain; and a packet filter configured to restrict access to at least one respective independent voice session only to those terminals having sufficient authorization for access to the at least one respective independent voice session.

* * * * *